United States Patent [19]

Sheridan

[11] Patent Number: 4,601,329
[45] Date of Patent: * Jul. 22, 1986

[54] AUTOMATIC TEMPERATURE CONTROL

[76] Inventor: John P. Sheridan, 5008 N. 35th St., Arlington, Va. 22207

[*] Notice: The portion of the term of this patent subsequent to Aug. 22, 2002 has been disclaimed.

[21] Appl. No.: 528,065

[22] Filed: Aug. 31, 1983

[51] Int. Cl.⁴ .............................................. F25B 29/00
[52] U.S. Cl. ...................................... 165/22; 165/28; 165/30; 236/91 D
[58] Field of Search ...................... 165/18, 28, 22, 30, 165/25, 27, 48.2; 236/91 D, 91 R

[56] References Cited
U.S. PATENT DOCUMENTS

| | | | |
|---|---|---|---|
| 3,267,994 | 8/1966 | Sones et al. | 165/28 |
| 3,504,848 | 4/1970 | Foster et al. | 165/22 X |
| 3,994,276 | 11/1976 | Pulver | 165/48.2 X |
| 3,996,998 | 12/1976 | Garst et al. | 165/27 X |
| 4,103,826 | 8/1978 | Wass | 165/DIG. 2 X |
| 4,143,707 | 3/1979 | Lewis et al. | 62/160 X |
| 4,287,724 | 9/1981 | Clark | 165/164 X |
| 4,353,412 | 10/1982 | Krumhansl | 165/48.2 X |
| 4,437,511 | 3/1984 | Sheridan | 165/48.2 |

Primary Examiner—Albert W. Davis, Jr.
Assistant Examiner—Randolph A. Smith
Attorney, Agent, or Firm—Dennis H. Lambert

[57] ABSTRACT

An automatic temperature control system and method for maintaining a predetermined temperature in an enclosed space, wherein the temperature in a heat sink is sensed and compared with the outside temperature to anticipate whether a heating or cooling mode is or may be required. When a mode is selected, a "readiness" state signal is supplied to a preset control in the enclosed space. When the preset temperature is reached in the enclosed space, the preset control energizes the appropriate heating or cooling device to maintain the preset temperature in the enclosed space.

2 Claims, 3 Drawing Figures

AUTOMATIC TEMPERATURE CONTROL

BACKGROUND OF THE INVENTION

1. Field of the Invention

This invention relates generally to temperature control in enclosed areas. More specifically, the invention relates to automatic temperature control for buildings, wherein control means energizes heating or cooling means, as appropriate, to maintain a preset temperature.

2. Prior Art

Control of the temperature level in enclosed areas, such as residential and commercial buildings, is important not only for comfort of the inhabitants, but also for health and efficiency. Moreover, if the temperature level is going to be controlled to comfortable levels, energy considerations become important and means should be provided to maintain comfortable temperature levels with the minimum expenditure of energy.

With the advent of central heating and cooling systems for the enclosed areas of buildings, automatic controls were designed to maintain heating or cooling levels at or in a selected range. Most commercially available thermostatic controls incorporate a manually operated switch which enables the occupant to select either a "heat", "cool" or "off" mode of operation. Thus, if a "heat" mode is selected, the system will be energized only if the control thermostat calls for heat. Similarly, if the system has been set for cooling, the thermostat will energize the system only if the temperature rises above the preset level.

Examples of some prior art devices and systems are shown in U.S. Pat. Nos. 4,083,397; 4,078,601; 4,150,718; 4,333,316; 4,205,381; 3,942,718; 2,213,082; and 2,022,523. These patents disclose various thermostatic controls for automatic temperature control, but generally are set or switched to control only heat or only cool. None of the patents disclose any means for predicting or anticipating when a "heat" or a "cool" mode might be required and then switching the thermostatic control means to the appropriate "readiness" condition so that the system will automatically provide either heating or cooling, depending upon the preset temperature and the anticipated mode.

U.S. Pat. No. 4,183,397 discloses an automotive control system for either heating or cooling, depending upon a selected temperature on the control thermostat. However, this patent fails to disclose any means for maintaining a preset temperature in a building, and particularly with anticipation of whether a heating or cooling mode will be required.

U.S. Pat. No. 4,061,185 discloses the use of a heat sink for supplemental heating, but does not suggest any automatic control system with a heat sink used in anticipating whether a heat or cool mode will be required in a heating and cooling system.

As demonstrated by the above-listed patents, thermostatically controlled temperatures are not new. Enthalpy, or its use thereof is also not new. Moreover, heat anticipation is used in most thermostat controls, but cool anticipation is not used. Commercially available thermostats, including those of some of the listed patents, must be manually set for either "heat" or "cool". None of the prior art known to applicant teaches a system which uses means (heat sink) to anticipate whether a "heating" or "cooling" mode will be required and to provide an appropriate signal to a preset thermostat control which automatically energizes either a heating or a cooling device when a preset temperature is reached in the space being conditioned.

Current atmospheric temperature variations have dramatically increased due to upperatmosphere phenomena heretofor not experienced. Accordingly, heating and/or cooling might be required on any given day or series of days in order to maintain a predetermined temperature level in a building. Thus, while the outside (and inside) temperature might be cool in the morning, compelling the occupant of a building to select the "heat" mode on the central thermostat in order to achieve a comfortable temperature in the building, by afternoon the outside and inside temperatures might be uncomfortably warm, necessitating that the occupant switch the thermostat to select a cooling mode. This necessitates not only that the occupant be present in order to switch the thermostat, but also that more energy be expended in order to bring the inside temperature back to a comfortable level.

Listening to weather reports and observing outside temperatures becomes tedious in the effort to determine if a heating or a cooling requirement should be anticipated. As noted above, energy efficiency degradation will result if the selected mode does not conform to the actual requirement in any 24 hour period.

SUMMARY OF THE INVENTION

The automatic temperature control system of the present invention is particularly adaptable to existing buildings, and specifically to homes having a conventional attic space of sufficient volume relative to the conditioned areas to act as a "heat sink". Successful anticipation of time related temperature levels, both indoor and out, requires an accurate readout of the outside temperature variable coupled with accurate sensing of the "heat sink" temperature variable.

In the present invention, a thermostat is provided in the heat sink (typically an attic space) to sense the heat sink temperature. A second thermostat is provided outside the building to sense the outside temperature. The heat sink thermostat and the outside thermostat are connected in tandem, and, depending upon the sensed temperatures, the outside thermostat provides a signal to a preset thermostat inside the building space to be conditioned. The heat sink thermostat and the outside thermostat place the inside thermostat in a condition of readiness for either cooling or heating, depending upon the sensed outside and heat sink temperatures. When the preset temperature is reached in the space being conditioned, the inside thermostat energizes either a heating or a cooling device, depending upon the sensed temperatures and the preset temperature. The system thus anticipates the proper mode to be selected via interior and exterior environmental sensors. Accordingly, the invention prevents undesirable "hunting" which results when a single temperature sensitive control oscillates about its temperature setting due to minor variations in the ambient. Similarly, it eliminates the necessity of manually switching between heating and cooling based upon observed conditions and presumptions regarding future variations.

For example, typical situations involving variations in the weather and operation of the invention are as follows:

(a) In the early morning, as the temperature normally rises, it is generally not known whether the temperature is rising fast enough to indicate sunshine, cloudiness or rain-or, whether it is sunny but turning cloudy, raining, sunny again, or some other condition.

(b) Assuming that at 9:00 AM or so, the outside air, which at 6:00-7:00 AM was cool enough to possibly require internal heating, has risen to a temperature level that definitely indicates a "no heat requirement" situation. It is likely that fair to full sun is present and the "heat sink" temperature will confirm this fact. If the heat sink temperature does not confirm fair to full sunshine (because of some predetermined temperature not having been reached in the heat sink), the thin sunshine is indicated and cooling will not be needed but heating might. If sunshine resumes, or was there all the time, when the outside air reaches a predetermined level the heat sink temperature will also be at a predetermined level and the outside thermostat and heat sink thermostat will trigger a mode shift to a "cooling readiness" situation by supplying a signal to the inside preset thermostat. When the inside temperature reaches its preset, the inside thermostat will energize a cooling device to condition the inside space.

(c) Assuming that the conditions of paragraph (b) above continue throughout the day, the system will be in the cooling mode. Ultimately, the outside air temperature will start to drop (normally), or a storm may cause a sudden temperature drop. If the outside air temperature drops below the predetermined outside air temperature mentioned in paragraph (b), the system will automatically revert to the "heating" mode because of the action of the outside thermostat. The inside thermostat will thus be placed in a condition of "readiness" for heating when the inside temperature drops to the predetermined temperature setting on the inside thermostat.

The heat sink thus provides an anticipator or buffer for predicting which mode will be required and prevents hunting of the thermostat control. Actual heating or cooling still remain under the control of the inside thermostat.

Accordingly, it is a primary object of this invention to provide a system for controlling the temperature in a building via automatic selection of heating or cooling mode requirements to preset temperature levels for each mode.

Another object of the invention is to provide a heating and cooling system that has means for anticipating whether a heating or cooling mode will be required to maintain a preset temperature in a building, by using interior and exterior environmental sensors arranged in a tandem combination.

A further object of the invention is to provide a heating and cooling system having means for automatically selecting either a heating or cooling mode and providing a readiness state for either anticipated mode without actuating either mode unless called for by main thermostat presets.

A still further object of the invention is to provide a heating and cooling system which uses a heat sink with a thermostat connected in tandem with an exterior thermostat to provide a readiness signal to an interior thermostat having preset temperatures, whereby the heat sink and exterior thermostats automatically select either a heating or cooling mode and the interior thermostat energizes a heating or cooling device when a preset temperature is reached, depending upon the mode selected by the tandem-connected heat sink thermostat and exterior thermostats.

BRIEF DESCRIPTION OF THE DRAWINGS

Other objects and advantages of this invention will appear in the following description and appended claims, reference being made to the accompanying drawings forming a part of the specification, wherein like reference characters designate like parts throughout the several views and wherein:

DESCRIPTION OF THE PREFERRED EMBODIMENT

Figure 1:
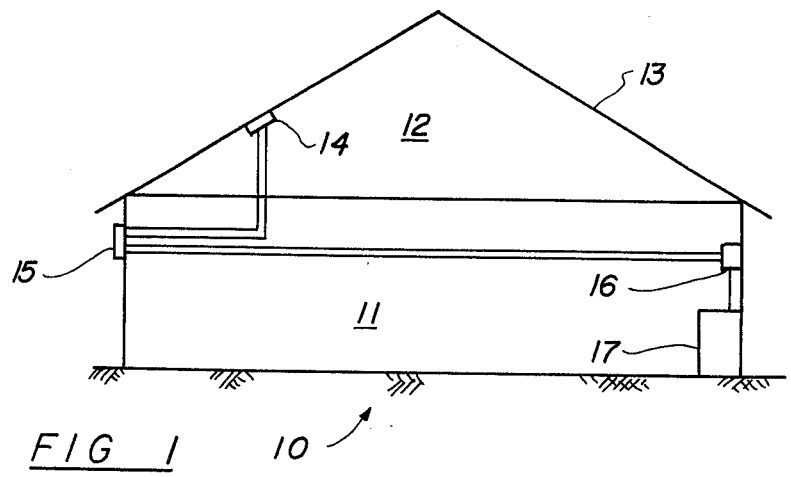
FIG. 1 is a schematic view of a building with the interior and exterior thermostats and heat sink thermostat.
Figure 2:
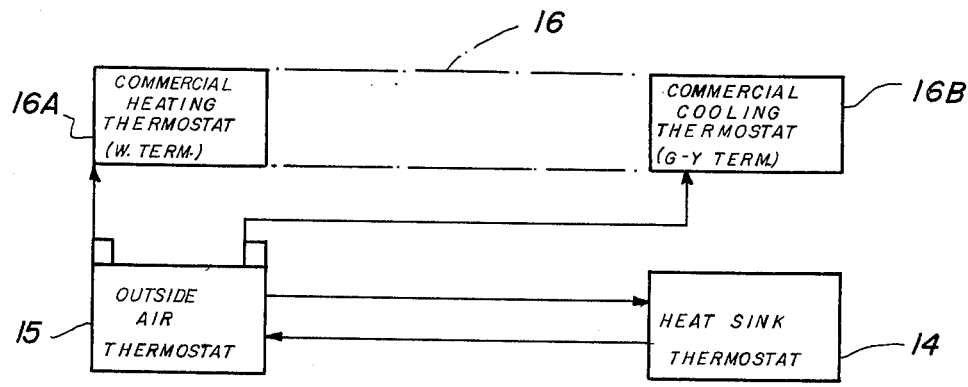
FIG. 2 is a schematic block diagram showing the arrangement or interconnection of the thermostats.

More specifically referring to the drawings, a building is indicated at 10 in FIG. 1 and comprises an enclosed space 11 in which the air is to be conditioned by heating or cooling, and an attic or enclosure 12 between the roof 13 and enclosed space 11. The attic serves as a heat sink in which the temperature tends to reflect the general temperature trend or steady state condition of the environment. In other words, the temperature in the heat sink does not fluctuate with minor or temporary temperature fluctuations in the outside environment.

A heat sink thermostat 14 of any suitable commercially available type is mounted in the heat sink 12 for sensing the temperature therein.

An exterior thermostat 15 is mounted outside the building for sensing ambient or outside temperature, and is connected in tandem with the heat sink thermostat. The outside thermostat 15 is, in turn, connected with an inside or interior thermostat 16, which may comprise a single unit or a pair of suitable commercially available heating and cooling thermostats 16A and 16B. The interior thermostat is connected with a suitable heating and cooling device 17 for appropriately conditioning the air in the building, depending upon the mode selected by the exterior and heat sink thermostats and the preset temperature on the inside thermostat.

Figure 3:
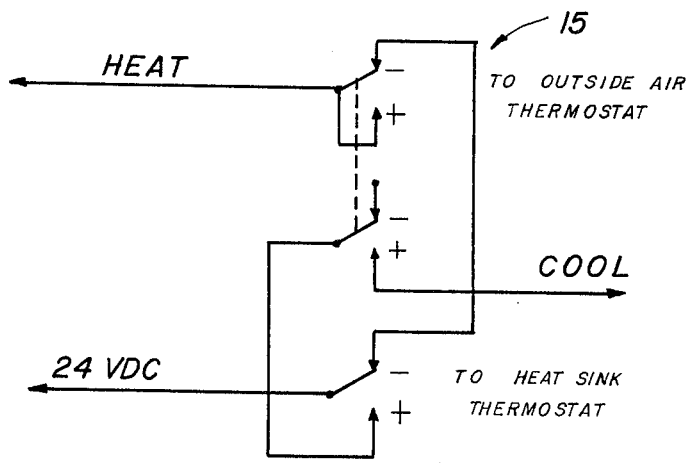
FIG. 3 is a schematic circuit diagram showing the elemental sequential thermostat switching arrangement.

Thus, with reference to FIG. 3, if both the heat sink thermostat and the outside air thermostat indicate that cooling is required, the switches will close to complete a circuit to the cooling thermostat 16B, placing that thermostat in a "readiness" state. When the preset temperature is reached in the interior space and thus on the inside thermostat, the inside thermostat will energize the cooling device 17. Similarly, if both the heat sink thermostat and the outside air thermostat indicate that heating is required, the switches will close to complete a circuit to the heating thermostat 16A, placing that thermostat in a "readiness" state. When the preset temperature is reached in the interior space and thus on the inside thermostat, the inside thermostat will energize the heating device 17. However, if either the heat sink thermostat or the exterior thermostat indicates a different conditioning requirement than indicated by the other of these two thermostats, the switches will not function to complete a circuit to the respective inside thermostat. Accordingly, minor or temporary fluctuations in ambient temperature will not cause switching of the inside thermostat between heating and cooling modes. The heat sink provides a buffer which smooths out such variations and causes a change in the selected mode only when the outside temperature change continues for a sufficiently long time to effect a change in the heat sink temperature. Relatively accurate anticipation of whether a heating or cooling mode is required is thus achieved and the system is automatically switched from one mode to the other without requiring attention by the person or persons occupying the building.

While the automatic temperature control has been shown and described in detail, this invention is not to be considered as being limited to the exact form disclosed, and changes in detail and construction may be made therein within the scope of the invention, without departing from the spirit thereof.

Having thus set forth and disclosed the nature of this invention, what is claimed is:

1. An automatic temperature control system for maintaining a preset temperature in an enclosed space in a building, comprising:

heating and cooling means for conditioning the air in the enclosed space to maintain the preset temperature;

exterior thermostat means outside the building for sensing ambient exterior temperature levels;

interior thermostat means in the enclosed space, preset to the preset temperature to be maintained and connected with the heating and cooling means to energize said means for heating or cooling, as appropriate, when the preset temperature is reached;

means defining a heat sink containing a volume of air heated by solar radiation, the volume of the heat sink being such that the temperature level therein is not affected by minor or temporary ambient temperature fluctuations; and heat sink thermostat means in the heat sink sensing the temperature in the heat sink, said heat sink thermostat means being connected in tandem with the exterior thermostat means and operative with the exterior thermostat means to switch the interior thermostat means to either a first readiness state for heating or a second readiness state for cooling, depending upon which mode is indicated by both the exterior and heat sink thermostat means, whereby said system automatically switches between heating and cooling, as required, in response to a comparison of exterior and heat sink temperatures.

2. A method of automatic temperature control for maintaining a preset temperature in an enclosed space in a building, comprising the steps of:

sensing the exterior, ambient temperature of the building;

sensing the interior temperature of the building;

sensing the temperature in a solar radiant energy heated heat sink having sufficient volume so that the temperature level therein is not affected by minor and temporary fluctuation in the ambient temperature;

comparing the heat sink and exterior temperatures and providing a heating or cooling mode selection signal when both temperatures indicate a requirement for the same mode; and energizing a heating or cooling device, as appropriate, when a mode selection signal is provided and the preset interior temperature is reached.

* * * * *